United States Patent [19]

Isaksson et al.

[11] Patent Number: 4,653,967
[45] Date of Patent: Mar. 31, 1987

[54] DEVICE FOR RESTRICTING ROLLING OF CYLINDRICAL OBJECTS

[76] Inventors: Bertil Isaksson, Frejavägen 3; Lennart Steiding, Eddavägen 40, both of S-194 54 Upplands-Väsby, Sweden

[21] Appl. No.: 737,640

[22] Filed: May 24, 1985

[30] Foreign Application Priority Data

May 24, 1984 [SE] Sweden ................................ 8402819

[51] Int. Cl.⁴ .............................. B60P 7/12; B60T 3/00
[52] U.S. Cl. ........................................ 410/49; 188/32; 410/30; 410/42
[58] Field of Search ................ 410/3, 4, 19, 9, 36, 410/37, 42, 47, 48, 49, 30; 188/32, 36; 248/316.2, 352, 172; 104/172 B

[56] References Cited

U.S. PATENT DOCUMENTS 2,720,285 10/1955 Taylor .................................. 188/32
2,822,063 2/1958 Hampton ............................. 188/32
3,260,219 7/1966 Vani ................................. 104/172 B
3,338,338 8/1967 Lindeen ............................... 188/32
3,596,605 8/1971 Shelstad .......................... 104/172 B

FOREIGN PATENT DOCUMENTS 0675784 5/1929 France .................................. 188/32
0703585 2/1954 United Kingdom .................. 410/30

Primary Examiner—Robert B. Reeves
Assistant Examiner—Scott H. Werny
Attorney, Agent, or Firm—Pollock, Vande Sande & Priddy

[57] ABSTRACT

A device for restricting rolling in one direction of cylindrical objects includes telescopically extensible tubes preferably having rectangular cross-sections. A spring is mounted within the tubes to urge the tubes towards each other. In the respective free ends of the tubes are releasably mounted a wedge shaped block preventing rolling in one direction, and an assembly of two rolls to allow rolling in the opposite direction.

11 Claims, 9 Drawing Figures

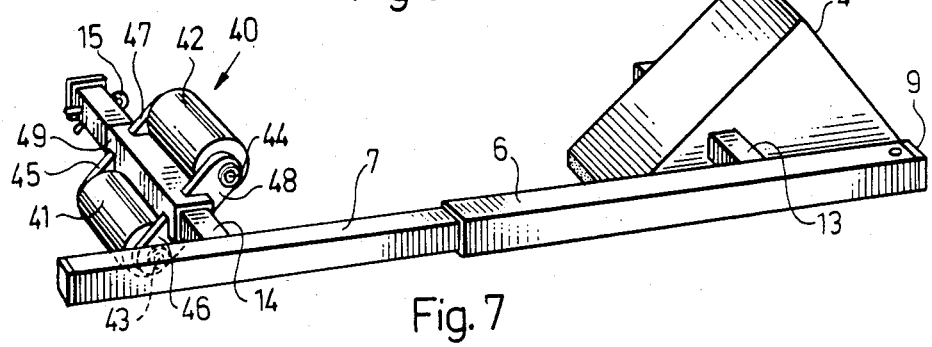
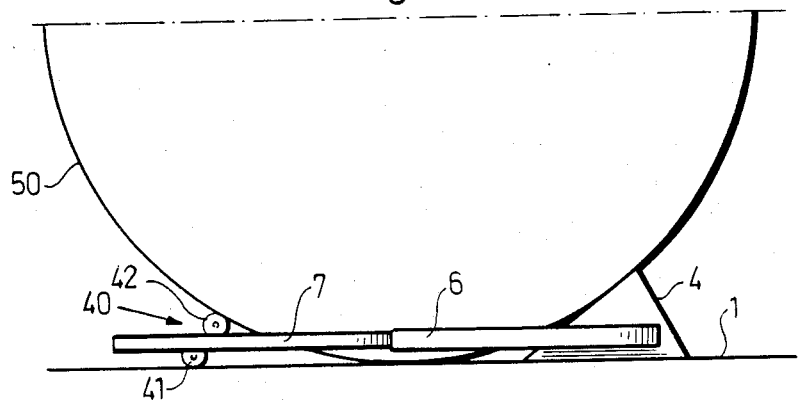
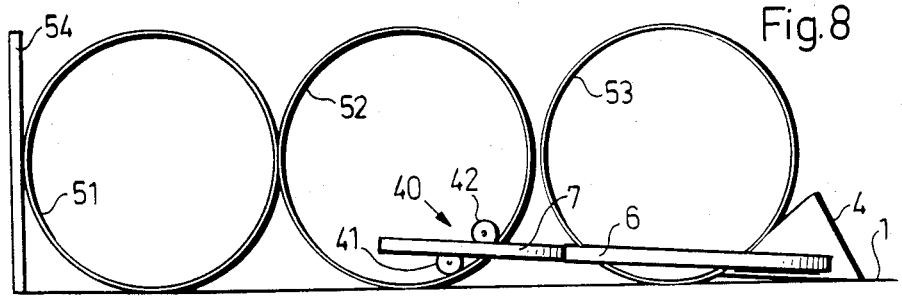
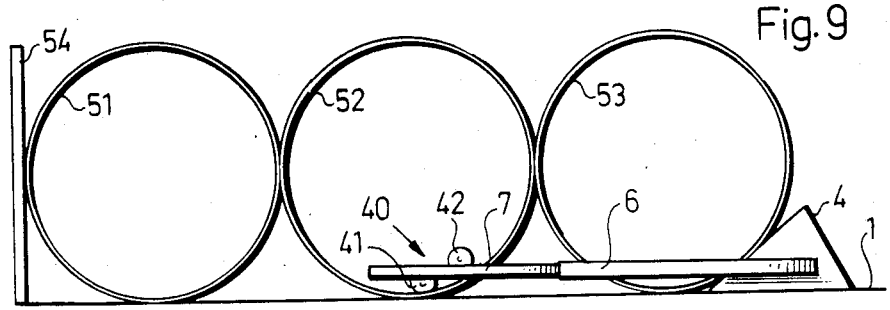

DEVICE FOR RESTRICTING ROLLING OF CYLINDRICAL OBJECTS

FIELD OF THE INVENTION

The present invention concerns a device for restricting rolling of cylindrical objects in one or both directions particularly such objects loaded on trucks, railroad cars and the like.

BACKGROUND OF THE INVENTION

For the safe and legal transportation of rolling cargo, i.e., cargo having cylindrical or spherical contact with a cargo supporting plane, such as logs, paper rolls and wheeled vehicles, two kinds of co-acting cargo securing means are required, namely (1) a lashing retaining the cargo against the cargo supporting plane, and (2) means preventing unintentional movement of the cargo on such plane. The present invention concerns the latter kind of securing means.

From DE-C-414 974 and 415 858 is known a device of the initially mentioned kind, which is intended for securing barrels against rolling when transported on railroad cars and trucks. The device comprises four blocks located substantially at the corners of a rectangle. At the long sides of the rectangle, the blocks are interconnected by means of square irons, along which the blocks are slidable, and at the short sides of the rectangle by means of chains, in which are springs pulling the blocks towards each other.

The known device has the disadvantage that it requires co-operation between the bars, the blocks and the chains to function satisfactorily. It can be introduced only with difficulty, or not at all, under bulky and low objects, since in such case the chain of a short side must be loosened before the device is introduced and thereafter be relocated between the two inner blocks. Without that chain the two outer blocks of the device could possibly function for a short time, but due to vibrations and cargo movements the lack of guidance therebetween will soon cause them to lose their function. The connection between two blocks by means of a chain also makes it necessary to grasp both these blocks when locating the device.

SUMMARY OF THE INVENTION

The object of the invention is to provide an improvement of the known device which can be introduced from one side of the object, which can be grasped on one spot when being located and which gives good mutual guidance between the blocks.

BRIEF DESCRIPTION OF THE DRAWINGS

The invention will now be described with reference to the accompanying drawings, wherein several embodiments of the invention are shown for purposes of illustration and wherein:

FIG. 6 shows a perspective view of a third embodiment of the invention;

FIG. 7 shows a side view of the device according to FIG. 6 used with a relatively large diameter object; and FIGS. 8 and 9 show side views of same used with relatively small diameter tubular objects.

DESCRIPTION OF PREFERRED EMBODIMENTS

Figure 1:
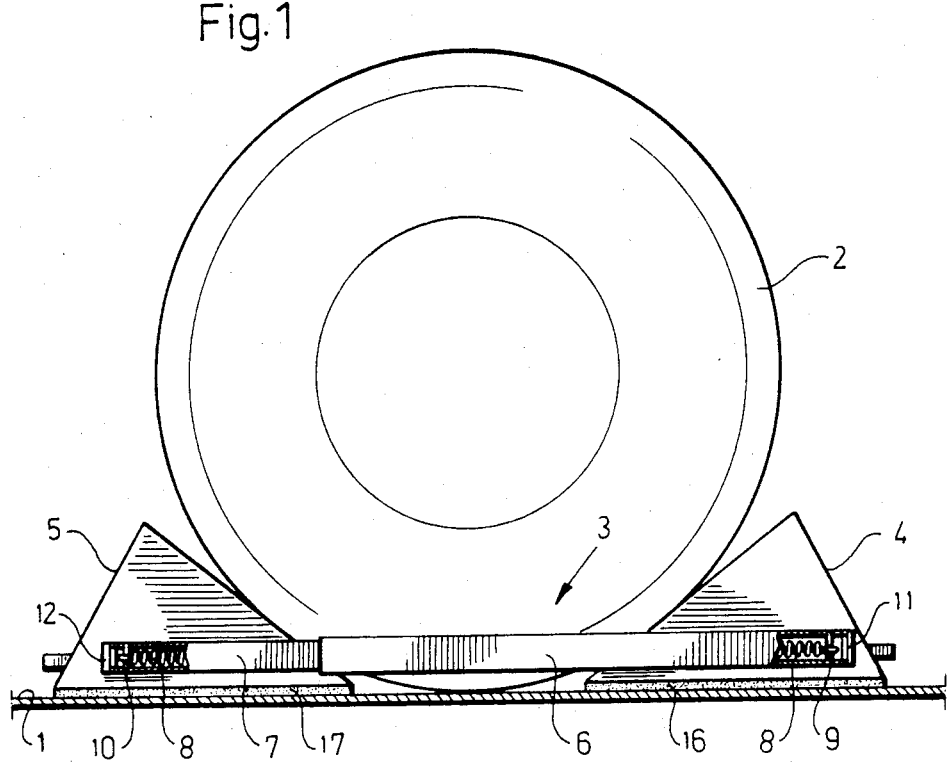
FIG. 1 shows a side view, partly in section, of an embodiment of a device according to the invention.

FIG. 1 shows a cylindical object 2, e.g., a vehicle wheel, resting on a cargo supporting plane 1, said object being secured against rolling by means of a device 3 according to the present invention. This device includes two wedge-shaped chock blocks 4 and 5, which have their wedge apices directed towards each other and which are interconnected by means of two bar shaped members 6 and 7. At least a first of the bar members 6 is tubular and the second is telescopingly slidably inserted in the former. Between the two bar members acts a spring force tending to bring the blocks 4 and 5 towards each other. According to a preferred embodiment of the invention, the second bar member 7 is also tubular, and a pulling screw spring 8 is mounted within the two tubes guided in each other, such that it acts between the ends of the tubes where cylindrical spring pins 9 and 10, respectively, connect the spring ends to the respective tube by means of bores through opposite tube walls. Plastic plugs 11 and 12 close off the free tube ends.

Figure 2:
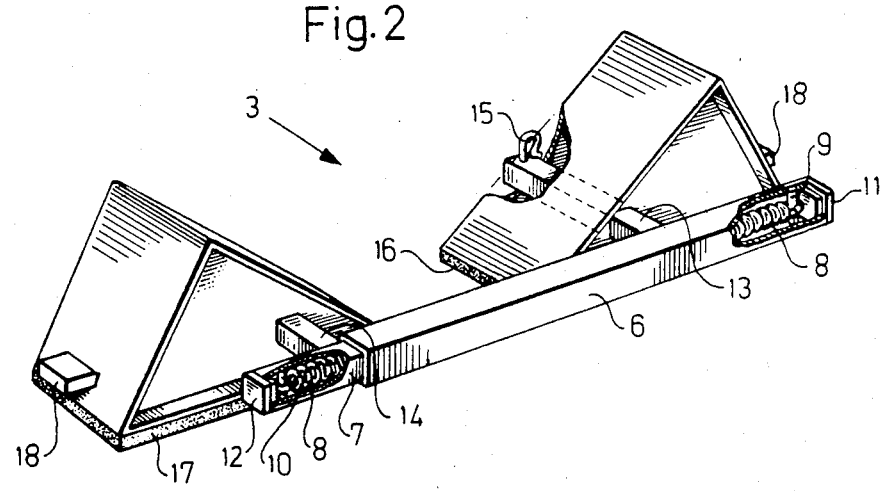
FIG. 2 shows the same in a partially sectioned perspective view.

From the tubes 6 and 7 extend, preferably at right angles, bar shaped studs 13 and 14, respectively, which are rigidly connected to the respective tube (FIG. 2). The studs 13 and 14 are introduced through openings extending across the blocks 4 and 5, respectively. At their free ends, the studs 13 and 14 are secured against being pulled out by means of hairpin locks 15.

Preferably, the tubes 6 and 7 have polygonal and more preferably rectangular cross-sections to prevent mutual rotation of the tubes and the blocks. In the examples shown, the tubes 6 and 7 have square cross-sections. Also advantageously, the studs 13 and 14 and the openings therefor in the blocks 4 and 5 have polygonal and preferably rectangular cross-sections to prevent tilting of the blocks about the studs. In the examples shown, the studs 13 and 14 also have square cross-sections.

To increase the friction between the cargo supporting plane 1 and the blocks 4,5 the latter advantageously are provided with a layer 16 and 17, respectively, of rubber or the like material.

The spring 8 is so weak that a person without effort can extend the telescoping bar arrangement from the shortest position shown in FIG. 2, wherein the tube 6 abuts the stud 14, to such distance between the blocks 4 and 5 that these can be introduced on either side of an object 2 which is to be secured against rolling. Nevertheless, the spring 8 is so powerful that it is capable of moving the blocks 4 and 5 towards each other when they are unloaded, i.e., when their friction against the cargo supporting plane is relatively low. It is hereby ensured that if an object is moving in any direction, for instance as a consequence of braking, or comes into oscillation, the unloaded block will move closer to the other block provided the unloading is sufficiently great, i.e., if the distance between the blocks is or has become too large to keep the cargo sufficiently secured.

In order to release the device 3 from the cargo when unloading cargo, the blocks 4 and 5, in this embodiment consisting of welded box structures of steel or aluminum, are provided with welded ears 18 against which a breaking tool, e.g., a crow bar, may be applied in order to raise a block from the cargo supporting plane and thereby lower the friction such that the block may be moved away from the object under extension of the telescopic bar system 6,7.

Figure 3:
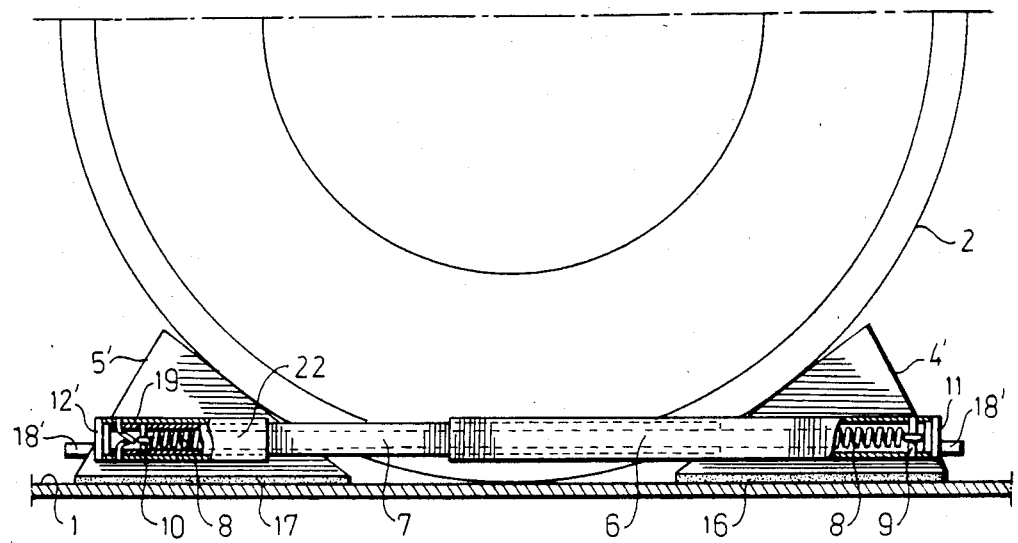
FIG. 3 shows in a manner similar to FIG. 1 a second embodiment of the invention.
Figure 4:
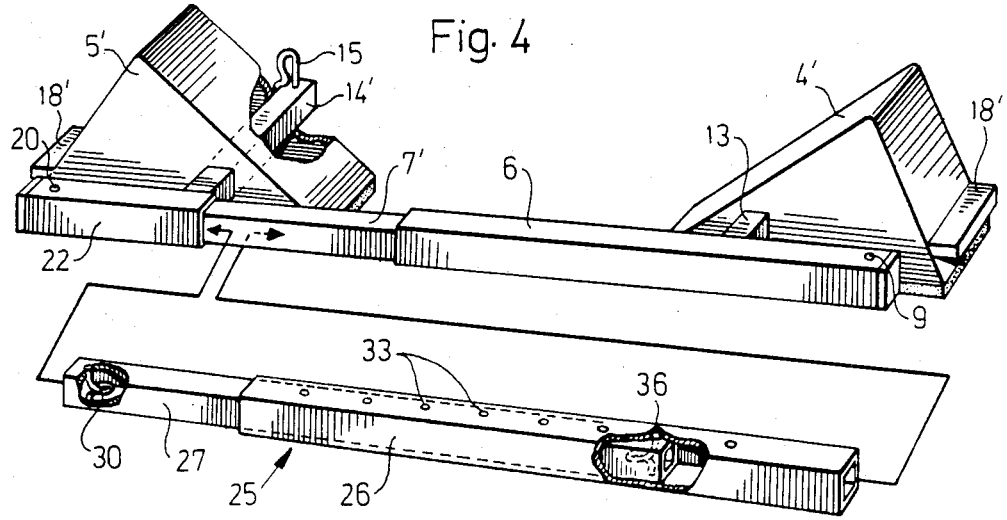
FIG. 4 shows the same in a perspective view together with an extension piece adapted for this embodiment.
Figure 5:
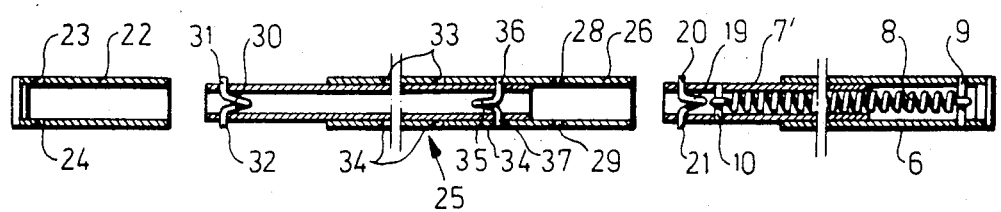
FIG. 5 shows a longitudinal section through the latter between the bar members of the first embodiment.

The embodiment of the invention described above has a limited length of travel. Accordingly, the invention comprises a second embodiment in which the length of travel can be varied. This embodiment is shown in FIGS. 3 to 5. In those figures, the same reference numerals as in FIGS. 1 and 2 are used for corresponding elements whereas details having a similar function have the same reference numeral with a prime character.

The blocks 4' and 5' shown in FIGS. 3 and 4 comprise extruded aluminum profiles, the interiors of which, however, are not shown in detail. The ears 18' extend along the entire width of the blocks 4' and 5'.

The resilient bar system is substantially similar to the one described above. Thus, the tube 6 and its stud 13 are unchanged, as are the spring 8 and its connecting pins 9 and 10. The latter, however, is located at a greater distance from the end of tube 7' then in the first embodiment. Outside of pin 10 is a snap-action spring 19, which by means of pin shaped ends 20,21 extends through opposite bores in the tube 7' (FIGS. 3 and 5).

The end of the tube 7' is introduced in a short tube 22 having the same cross-sectional dimensions as the tube 6. Close to the end of the tube 22 are opposite bores 23,24 in the tube walls, into which the ends 20,21 of the snap-action spring 19 snap so that the tubes 7' and 22 are interconnected. The tube 22, is provided with a laterally extending stud 14', which in a manner similar to the above is secured to the block 5' by means of a hair pin lock 15.

Up to this point, the second embodiment functionally entirely corresponds to the first embodiment and also has a limited length of travel.

By depressing the ends 20,21 of the snap-action spring 19, however, the tubes 7' and 22 can be released from each other and an intermediate piece be interconnected therebetween. The intermediate piece 25 comprises two tubes 26 and 27 telescopingly guided in each other, the tube 26 having the same cross-sectional dimensions as the tube 6 and the tube 27 having the same cross-sectional dimensions as the tube 7'. The intermediate piece 25 is shown in FIG. 4 and its location between the tubes 7' and 22 is indicated by arrows.

The principle for interconnection of the intermediate piece 25 between the tubes 7' and 22 is shown more in detail in FIG. 5. The tube 26 is provided with opposite bores 28 and 29, into which the ends 20 and 21 of the snap-action spring 19 are intended to snap upon introduction of the tube 7' into the tube 26, thereby to lock the tubes to each other. In the end of the tube 27 extending from the tube 26 is located a snap-action spring 30, the pin shaped ends 31 and 32 of which extend through opposite bores in the walls of the tube 27. The ends 31 and 32 of the snap-action spring 30 are intended to snap into the bores 23 and 24 of the tube 22 when the tube 27 is introduced therein. Having the intermediate piece 25 interconnected in the manner now described between the tubes 7' and 22, the blocks 4' and 5' may be positioned at a desired distance from each other by telescopic extension of the intermediate piece 25. To lock the intermediate piece 25 in a desired position of extension, the tube 26 is provided with a plurality of bores 33 and 34 extending through opposite tube walls, and the tube 27 is provided in its end opposite to the snap-action spring 30 with a similar snap-action spring 35, the ends 36 and 37 of which may snap into selective ones of the bores 33 and 34.

In some instances, rolling of a cylindrical object in one direction may be desirable e.g., when loading a plurality of paper rolls or tubes from the rear end of a railroad car or a truck. In such case, the objects are allowed to roll forward until they reach a forward end wall or the like. The third embodiment of the invention is intended for use in such cases.

This embodiment is shown in FIGS. 6 to 9 and may utilize some basic parts of the first and/or second embodiment, i.e., the telescoping bar members 6 and 7, the studs 13 and 14 respectively extending therefrom, and the wedge shaped block 4 mounted on the stud 13.

On the stud 14 of the tube 7 is mounted a roller means 40, including two rolls 41 and 42. These rolls are individually and freely rotatable about axes parallel with the stud 14. In the embodiment shown, the rolls 41 and 42 are rotatable about shafts 43 and 44, respectively, mounted between pairs of brackets 45,46 and 47,48, respectively extending in opposite directions from a holder 49 which is non-rotatably mounted on the stud 14. In practice, holder 49 is a tube, the inner cross-section of which corresponds to the outer cross-section of the stud 14 so that the holder 49 can be slid on the stud 14. As in the previous embodiments, hair-pin lock 15 secures the holder 49 on the stud 14. Preferably a plane through the shafts 43 and 44, in the mounted state of the roller means, forms an angle of 45° with the bar member 7.

The device according to the third embodiment of the invention is applied about a cylindrical object in a manner corresponding to that of the former embodiments. As will appear from FIG. 7, where the device is used with a relatively large diameter object 50, such as a paper roll, rolling to the right will be prevented by the wedge shaped block 4, whereas rolling to the left can take place due to contact between the object 50 and the roll 42, on the one hand, and between the roll 41 and the plane 1, on the other hand. Upon rolling of the object 50 to the left, the spring loaded telescoping bar members 6,7 will extend slightly so as to unload block 4 which will then be dragged along to the left. Upon contact with any obstacle preventing further rolling to the left, such as an end wall of a railroad car or a previously loaded object, bouncing of the object 50 the right will be effectively prevented by the block 4.

FIGS. 8 and 9 show how the device according to the third embodiment of the invention can be used on tubular, relatively small diameter objects 51,52,53. In this case, the roller means 40 may be introduced inside one object 52, whereas the wedge shaped block 4 engages an adjacent object 53. FIG. 8 shows the situation when the object 52, upon common travel of the objects 52 and 53 to the left, has just hit a previously loaded object 51, which rests against an end wall 54. In the next moment the object 53 will hit the object 52, and the spring force acting between the bar members 6 and 7 will ensure that the block 4 is kept close to the object 53, thus preventing any bouncing thereof to the right.

As appears from FIG. 8, rolling of one or both rolls 41,42 inside the object 52 during travel of the objects 52 and 53 to the left will cause raising of the bar members 6 and 7 and, thus, of the block 4, thereby further decreasing the friction of the latter against the plane 1.

As will be evident from the above description and the drawings, the first and second embodiments of the invention easily convert into the third embodiment simply by substituting the roller means for one of the wedge shaped blocks.

Apart from the aforementioned fields of use of the device according to the invention, further possibilities include use as parking blocks for airplanes and securing blocks for cars and trucks on board ferries.

We claim:

1. A device for restricting rolling of cylindrical objects said device including first bar members slidably guided for relative telescoping movements in each other, and spring means acting between said bar members to urge them towards each other, one of said bar members being adapted to receive at its free end a first substantially wedge shaped body for restricting rolling in a first direction, the other of said bar members being adapted to receive at its free end roller means allowing rolling in a direction opposite to said first direction, wherein each of said first bar members is provided with a second bar member extending substantially perpendicularly to the respective one of said first bar members to releasably, slidably but non-rotatably receive said roller means.

2. A device according to claim 1, wherein said first bar members are tubular, a spring being mounted within said tubular first bar members to pull them together.

3. A device according to claim 1, wherein said first bar members are prevented from relative rotation.

4. A device according to claim 3, wherein said first bar members have rectangular cross-sections.

5. A device according to claim 1, wherein said second bar member has a rectangular cross-section.

6. A device according to claim 1, wherein said first and second wedge shaped bodies are provided with resilient means for increased frictional engagement with a plane supporting a cylindrical object.

7. A device for restricting rolling of cylindrical objects in one rolling direction, said device comprising first bar members slidably guided for relative telescoping movements in each other, and spring means acting between said bar members to urge them towards each other, one of said bar members being adapted to receive at its free end a first substantially wedge shaped body for restricting rolling in a first direction, the other of said bar members being adapted to receive at its free end roller means for allowing rolling in a direction opposite opposite to said first direction.

8. A device according to claim 7, wherein each of said first bar members is provided with a second bar member extending substantially perpendicularly from the respective one of said first bar members to releasably, slidably but non-rotatably receive said roller means.

9. A device according to claim 7 or 8, wherein said roller means include two rolls having parallel axes of rotation.

10. A device according to claim 9, wherein said two rolls are journalled on shafts carried by a common holder.

11. A device according to claim 10, wherein said holder is adapted for non-rotational engagement on said second bar member.

* * * * *